(12) United States Patent
Ivov et al.

(10) Patent No.: US 10,778,736 B2
(45) Date of Patent: Sep. 15, 2020

(54) ON DEMAND IN-BAND SIGNALING FOR CONFERENCES

(71) Applicant: Atlassian Pty Ltd, Sydney (AU)

(72) Inventors: Emil Ivov, Austin, TX (US); Boris Grozev, Austin, TX (US)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 16/596,532

(22) Filed: Oct. 8, 2019

(65) Prior Publication Data

US 2020/0045091 A1 Feb. 6, 2020

Related U.S. Application Data

(63) Continuation of application No. 16/200,959, filed on Nov. 27, 2018, now Pat. No. 10,462,197, which is a continuation of application No. 15/635,045, filed on Jun. 27, 2017, now Pat. No. 10,171,526.

(51) Int. Cl.
*H04L 29/06* (2006.01)
*H04N 7/15* (2006.01)
*H04N 7/14* (2006.01)

(52) U.S. Cl.
CPC ........ *H04L 65/403* (2013.01); *H04L 65/1069* (2013.01); *H04N 7/147* (2013.01); *H04N 7/152* (2013.01)

(58) Field of Classification Search
CPC ... H04L 65/403; H04L 65/1069; H04N 7/152; H04N 7/147
See application file for complete search history.

(56) References Cited

U.S. PATENT DOCUMENTS

| | | | | |
|---|---|---|---|---|
| 8,321,794 | B2* | 11/2012 | Combel | G06Q 10/107 715/748 |
| 2014/0114664 | A1* | 4/2014 | Khan | H04N 7/147 704/270 |
| 2015/0264103 | A1* | 9/2015 | Kim | H04L 65/608 709/219 |
| 2016/0173464 | A1* | 6/2016 | Wang | H04L 61/2589 713/171 |
| 2018/0131672 | A1* | 5/2018 | Ravindranath | H04L 65/1069 |

OTHER PUBLICATIONS

Ivov, U.S. Appl. No. 16/200,959, filed Nov. 27, 2018, Office Action, dated Apr. 1, 2019.

* cited by examiner

*Primary Examiner* — Stella L. Woo
(74) *Attorney, Agent, or Firm* — Hickman Palermo Becker Bingham LLP

(57) ABSTRACT

A computer implemented method comprises transmitting initial signaling data for a video conference from a signaling server to a plurality of client computing devices, the initial signaling data omitting identifiers for media data, establishing, by a media server, the video conference with the plurality of client computing devices, the plurality of client computing devices having used the initial signaling data to connect to the media server, sending, by the media server, media data for a subset of the plurality of client computing devices to the plurality of client computing devices, sending, by the media server, identifiers of the media data to the plurality of client computing devices.

20 Claims, 4 Drawing Sheets

ON DEMAND IN-BAND SIGNALING FOR CONFERENCES

BENEFIT CLAIM

This application claims the benefit as a continuation of Ser. No. 16/200,959, filed Nov. 27, 2018; which claims the benefit as a Continuation of application Ser. No. 15/635,045, filed Jun. 27, 2017 now U.S. Pat. No. 10,171,526 issued Jan. 1, 2019; the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

The technical field of the present disclosure generally relates to improved methods, computer software, and/or computer hardware in telecommunication conferencing. More specifically, the present disclosure relates to computer-implemented techniques for on demand in-band signaling for conferences.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Video and audio calls and conferences are becoming both more common and larger in size every day. Originally, video calls, audio calls, and conferences hosted using computers were limited to direct connections between users in which a first user called a second user, enabling the users to see and hear each other during the call. As methods improved, conferences of five, ten, or more users all with streaming video and audio became more common. Simply sending all video and audio data from each participant to every other participant in such a large conference often is not feasible due to limitations on network bandwidth in local area networks and internetworks and the limited processing power in some client computing devices.

In response, solutions to large video and audio conferences were implemented with media servers using two general approaches: multipoint control units (MCU) and selective forwarding units (SFU). MCUs receive and process audio and video data from clients and typically mix the audio and video to create a single composite video. The composite video is then streamed to the clients in a single mix. While this solution enables relatively simple client software, the processing power needed for the MCU is high, and the resulting presentation at the client is generally inflexible. SFUs, in contrast, are more similar to packet data routers, as SFUs forward packets without media processing.

Although the use of media servers offers many advantages, there are inefficiencies introduced through their use. The inefficiencies are varied and impact the energy, computing power, and/or bandwidth needed to run a conferencing system. Improvements in efficiency of conferencing systems that use media servers are needed.

DETAILED DESCRIPTION

Figure 1:
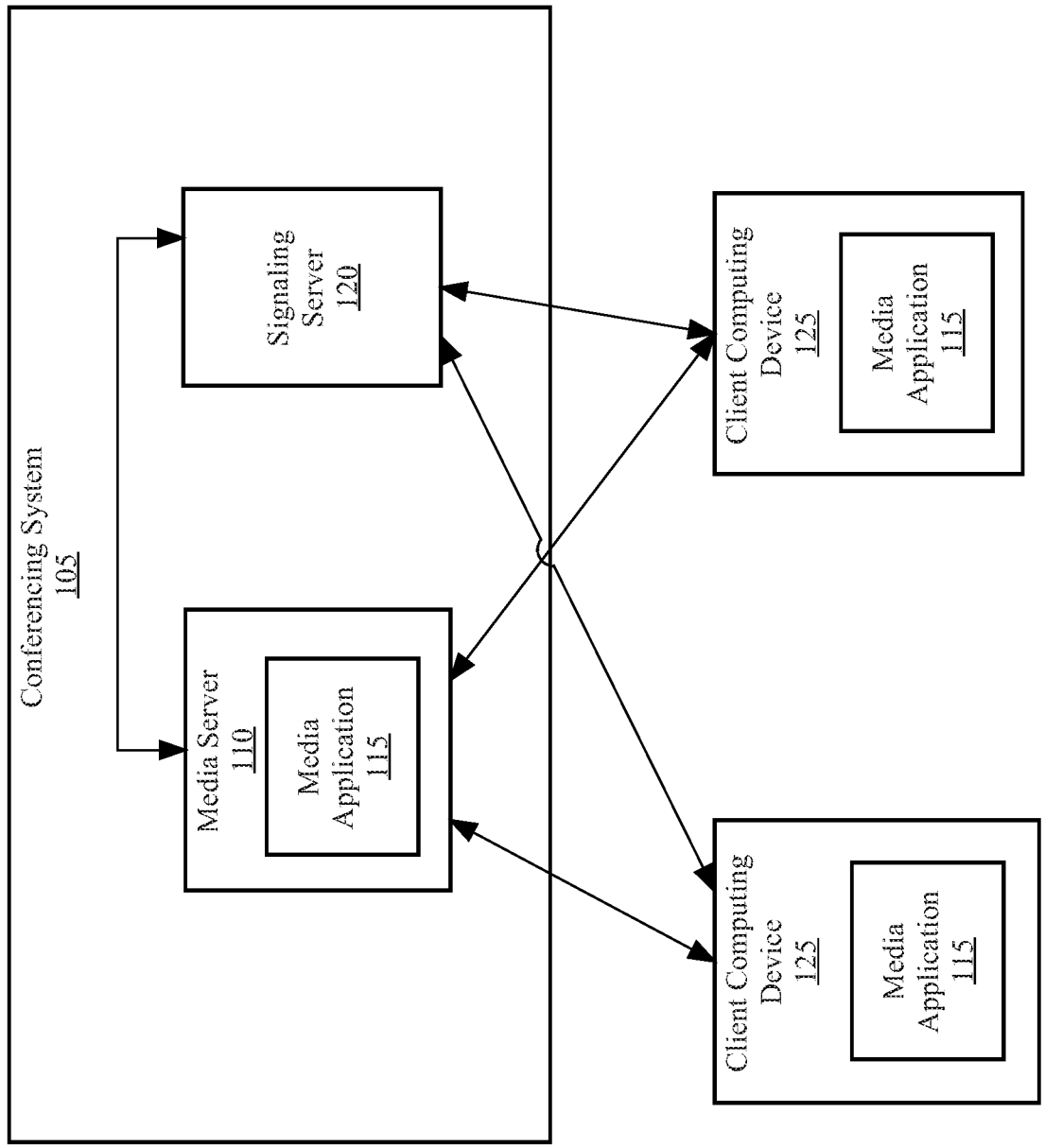
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. OVERVIEW
2. EXAMPLE COMPUTER SYSTEM IMPLEMENTATION
3. EXAMPLE FUNCTIONAL IMPLEMENTATION
4. EXAMPLE ON DEMAND IN-BAND SIGNALING
5. HARDWARE OVERVIEW 1. Overview The embodiments described herein may utilize many different standards and formats. Familiarity with aspects of various Requests for Comment (RFCs) published by the Internet Society or Internet Engineering Task Force is presumed for purposes of understanding the present disclosure. These include: Interactive Connectivity Establishment (ICE) defined in RFC 5245 and Session Description Protocol (SDP) defined in RFC 4566. Further, familiarity with Web Real-Time Communication (WebRTC), definition available from the World Wide Web Consortium (W3C), is also presumed for purposes of understanding the present disclosure. The reader and user of the present disclosure is presumed to possess copies of and to understand RFC 5245, RFC 4566, and WebRTC, and to have a sufficient level of knowledge and skill to apply RFC 5245, RFC 4566, and/or WebRTC to computer(s) in a network.

Computer-implemented techniques are provided for on demand in-band signaling for conferences. Generally, in a conference, a client computing device is connected to two servers: a signaling server and a media server. The media server handles the audio and/or video data streams for the conference. The signaling server manages other aspects, such as authentication, authorization, session establishment, identification of the other client computing devices in a conference, and exchange of metadata about the audio and/or video data streams. In large conferences, this setup becomes impracticable due to WebRTC limitations. WebRTC typically has substantial performance issues with large conferences. Further, the volume of signaling traffic may be large, and may inefficiently use bandwidth and processing power.

To resolve the above issues, on demand in-band signaling may be used, as discussed herein. Specifically, the signaling server omits identifier data in signaling, such as when assisting in establishing a conference. Instead, the media server that is providing conference participants with media data for the conference provides the identifier data via in-band signaling. Initially, client devices may contact a signaling server for data needed to establish a video conference, such as which media server to connect to. Subsequently, after establishing the conference using the media server, the media server provides identifier data in-band. Further, in contrast to standard signaling server procedure, the media server does not provide identifier data for every client computing device in the conference. Rather, the media server provides identifier data for a subset of the client computing devices in the conference. The identifier data may be provided for a predetermined amount client computing devices, such as five, or may vary dynamically based on the needs of the conference. Further, the media server may update and change the identifiers as needed, such as when the media server begins sending a new audio or video data stream to participants in the conference.

In one embodiment, a computer implemented method comprises transmitting initial signaling data for a video conference from a signaling server to a plurality of client computing devices, the initial signaling data omitting identifiers for media data, establishing, by a media server, the video conference with the plurality of client computing devices, the plurality of client computing devices having used the initial signaling data to connect to the media server, sending, by the media server, media data for a subset of the plurality of client computing devices to the plurality of client computing devices, sending, by the media server, identifiers of the media data to the plurality of client computing devices.

Other embodiments, aspects and features will become apparent from the disclosure as a whole.

2. Example Computer System Implementation

FIG. 1 illustrates a system in which the techniques described may be practiced, according to one embodiment. In an embodiment, conferencing system 105 comprises components that are implemented at least partially by hardware at one or more computing devices, such as media servers 110, or one or more hardware processors, executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates conferencing system 105, media server 110, media application 115, signaling server 120, and client computing device 125. Conferencing system 105 may execute on any computing device or devices, including but not limited to: servers, racks, work stations, personal computers, general purpose computers, laptops, Internet appliances, wireless devices, wired devices, multi-processor systems, mini-computers, and the like. Although FIG. 1 shows conferencing system 105 as a single element, conferencing system 105 broadly represents one or multiple computing devices, and may be located in one or more physical locations. Conferencing system 105 also may represent one or more virtual computing instances that execute using one or more computers in a datacenter such as a virtual server farm. Conferencing system 105 may be connected through any kind of computer network using any combination of wired and wireless communication, including, but not limited to: a Local Area Network (LAN), a Wide Area Network (WAN), one or more internetworks such as the public Internet, or a company network.

Generally speaking, conferencing system 105 provides conferencing services to any client computing device that connects to the conferencing system and acts as a bridge or relay for enabling the participants to communicate. The conferences may be video conferences, audio conferences, a combination thereof, or any other type of conference. The size of the conference may be from two participants to hundreds of participants or more. During a conference, connected client computing devices send media data to conferencing system 105, and conferencing system 105 directs the media data to the other participants as needed. The media data may include video data, audio data, or a combination thereof. Additional details of the components and functionalities of conferencing system 105 is discussed below.

Media server 110 may be any computing device, including but not limited to: servers, racks, work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Although FIG. 1 shows media server 110 as an individual device, media server 110 may be multiple devices, such as a server cluster, and may be located in one or more physical locations. Media server 110 may host or execute a media application 115, and may include other applications, software, and other executable instructions to facilitate various aspects of embodiments described herein.

In one embodiment, media server 110 may be a selective forwarding unit (SFU) or multipoint control units (MCU) used for audio or video conferencing. MCUs receive and process audio and video data from clients and typically mix the audio and video to create a single composite video. The composite video is then streamed to clients in a single mix. While this solution enables relatively simple client software, the processing power needed for the MCU is high, and the resulting presentation at the client is generally inflexible. SFUs, in contrast, are more similar to packet data routers, as SFUs forward packets without media processing. Although a single media server is shown in FIG. 1, any number of media servers may be used, such as two, ten, or more. When more than one media server 110 is used, the media servers 110 may be organized or arranged in any fashion, such as a full mesh topology, where each media server communicates with each other media server, or a hierarchy, where each media server has a parent and/or child media server with which it communicates. Media server 110 is communicatively connected to signaling server 120, and/or client computing devices 125 through any kind of computer network using any combination of wired and wireless communication, including, but not limited to: a LAN, a WAN, the Internet, or a company network. Media server 110 executes media application 115. Media application 115 is discussed in detail below.

Signaling server 120 is a signaling server used for initiating conferences. Signaling server 120 may be any computing device, and may execute one or more applications (not shown) to provide the functionality needed for certain embodiments described herein. Signaling server 120 may use Session Initiation Protocol (SIP), Extensible Messaging and Presence Protocol (XMPP), Jingle, and/or any other suitable protocol to assist in establishing a conference. As part of initiating a conference, signaling server 120 may receive requests from client computing devices, and determine a media server with which to connect the client computing device. The determination may be based on the load of the media server, the location of a particular media or data item the client wishes to access or any other basis. The particular media or data item may comprise a media server hosting an audio or video conference.

Signaling server 120 provides the initial signaling data needed for client computing devices to connect to their conference. The initial signaling data may include a media type in use, a certificate fingerprint, a credential, an Internet Protocol (IP) address or port number of a media server for the conference, etc. In contrast to WebRTC requirements, signaling server 120 does not provide identifiers for media data or identifiers of client computing devices. Rather, media server 110 provides the identifiers for media data and identifiers of client computing devices in-band, as discussed below. Optionally, signaling server 120 may include identifier data in the initial signaling data. In particular, signaling server 120 may include an initial amount of identifier data in the initial signaling data to reduce the initial delay when client computing devices connect to a conference. In this embodiment, after the initial signaling data is received, the media server provides any subsequent identifier data needed, as discussed below. Signaling server 120 may perform any other functionalities as needed to aid in certain embodiments described herein.

Conferencing system 105 may also include additional components that are not shown in FIG. 1, such as a proxy, router, or other device through which media servers 110 may be accessed. The proxy, router, or other device may provide Network Address Translation (NAT) or other functionalities as needed by conferencing system 105. Conferencing system 105 may also include a data store, database, or other storage devices to store any digital electronic data as needed by conferencing system 105. Further, conferencing system 105 may include any other suitable component.

In one embodiment, client computing devices 125 may be any computing devices, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like. Although two client computing devices 125 are shown in FIG. 1, any number of client computing devices may be present. Client computing devices 125 are communicatively connected to signaling server 120 and/or a media server 110 through any kind of computer network using any combination of wired and wireless communication, including, but not limited to: a LAN, a WAN, the Internet, or a company network, and may connect directly to other client computing devices 125 using a P2P connection while participating in a video conference using the methods described herein. Client computing devices 125 may include applications, software, and other executable instructions to facilitate various aspects of embodiments described herein. In one embodiment, client computing devices 125 include client software that is programmed to support video conferencing or audio conferencing, such as media application 115.

Media server 110 and/or client computing devices 125 may execute media application 115. In some embodiments, other components may execute media application 115 or portions thereof, as needed. Media application 115 is a media application for conferencing. Media application 115 may be available in multiple versions, such as a version for servers and a client version. The client version of media application 115 may be thin-client and accessed through a web browser, or may be thick-client. The server version may be installed and used by a specific company or entity, may be offered over the public Internet via a web browser, or may be part of a Software as a Service (SaaS) implementation where entities sign up for access to the conferencing service. Regardless of which version of media application 115 is in use, the functionalities provided may be the same, although the distribution of work or actions performed by a given media application may vary based on configuration details or the versions used.

Media application 115 is programmed or configured to establish a conference with multiple client computing devices 125. The conference may be an audio or video conference, and the conference may be established using any format or manner. For example, Interactive Connectivity Establishment (ICE) and Web Real-Time Communication (WebRTC) may be used. The client computing devices 125 may connect to media server 110 in any suitable manner. If multiple media servers 110 are used, the client computing devices may connect in any configuration or distribution. For example, one media server may have three client computing devices connected while another media server has one client computing device connected. The conference may be established using, in part, data provided by signaling server 120.

Media application 115 is programmed or configured to send and receive media to and from media servers and client computing devices. The media data may be sent in any format or manner, and may include video data, audio data, or video and audio data. The media data may be for any number of the client computing devices that are in the conference, such as a subset of the client computing devices, or every client computing device. For example, media application 115 may send, to each client computing device, video data for five out of forty client devices in the conference. Media application 115 may determine which media data streams should be sent to client computing devices using any method and at any time, such as by using dominant speaker identification. In the context of video or audio conferences, dominant speaker identification is the process of identifying a current dominant speaker in the conference. Typically, this is the person who is presenting or currently speaking in a conference. The dominant speaker may change during a conference, such as when a presenter takes questions from the audience. Dominant speaker identification is performed using audio data, and may be performed in many different ways, such as by using a decibel value in the header of an audio packet, which are beyond the scope of this patent document. Media application 115 may change what media data is sent to client devices at any time during the conference based on any factor, such as when the dominant speaker changes.

Media application 115 is programmed or configured to determine and send signaling data in-band to client computing devices. The signaling data sent by the media application 115, such as from media server 110 to a client computing device 125, are identifiers for media data, identifiers for client computing devices in the conference, and synchronization data. Specifically, the signaling data sent by media application 115 may include a Synchronization Source Identifier (SSRC), a Media Stream Identifier (MSID), a client computing device identifier, or any other identifiers. SSRC is an identifier of media data, MSID identifies an origination of media data so that data from the same source may be synchronized such as audio and video from the same source, and the client computing device identifiers identify the various client computing devices in the conference. Media application 115 may determine and track the signaling data in any manner. Likewise, media application 115 may send the signaling data in-band to client computing devices in any manner and at any time.

Media application 115 may send any amount of signaling data to the client computing devices. Specifically, media application may send identifiers for a subset of client computing devices of the conference, rather than for every single client computing device in the conference. The subset for which identifier are sent may be identified in any manner, and may be of any size. For example, signaling data for the five most recent speakers may be sent to the client computing devices of the conference.

Media application 115 is programmed or configured to update the signaling data sent to client computing devices. The signaling data may be updated in response to different media data being sent to client computing devices, or for any other reason. Updating may include removing identifiers for media data that is no longer sent to client computing devices, or adding identifiers for media data that is newly sent to client computing devices. The updating may include new identifiers specific to a given media data stream or client computing device. In other words, the identifiers are not values that are reassigned to different media data streams. Updating the signaling data may be performed by a media server 110.

Media application 115 is programmed or configured to update mappings for media data at client computing devices. The mappings may be updated in any manner, and are updated based on the identifiers received from a media server 110 using in-band signaling. The mappings may be maintained and updated in any manner or format, at any time.

3. Example Functional Implementation

Figure 2:
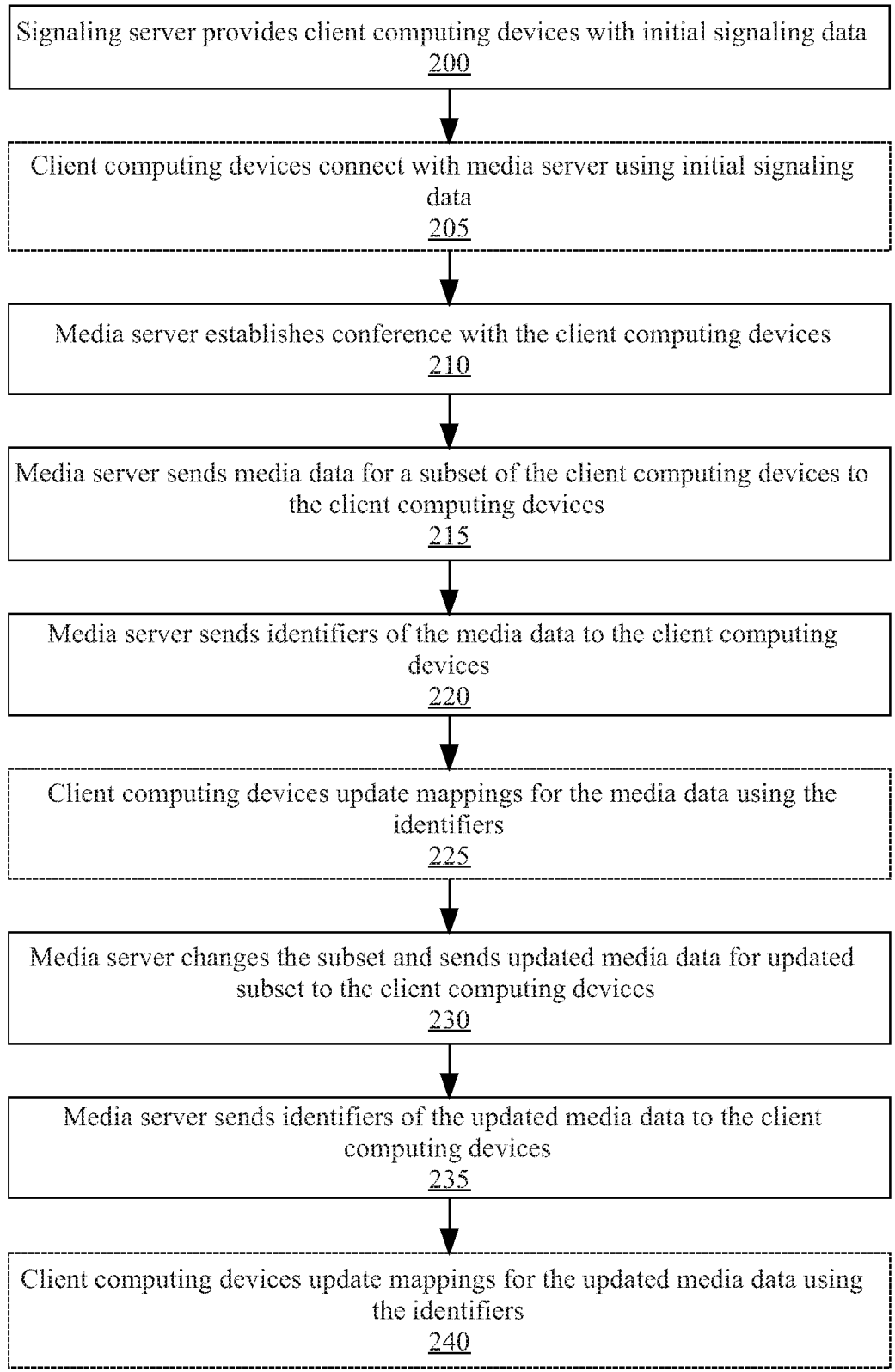
FIG. 2 illustrates a programmable algorithm or method for on demand in-band signaling for conferences in accordance with an embodiment.

FIG. 2 illustrates an example programmable algorithm or method for on demand in-band signaling in conferences. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, a signaling server provides client computing devices with initial signaling data. The initial signaling data may be sent or transmitted to the client computing devices in any manner and format. The initial signaling data includes data needed by the client computing devices to establish a conference. Examples of initial signaling data include media types in use such as a particular codec, data about session establishment such as Interactive Connectivity Establishment (ICE) credentials and candidates, and Datagram Transport Layer Security (DTLS) certificate fingerprints. The initial signaling data does not include identifier data used by client computing devices for mapping media data streams to particular client computing devices of the conference. Rather, the identifier data is provided by the media server, as discussed herein. Optionally, the initial signaling data may include a portion of identifier data used by client computing devices, to decrease the initial delay when a client computing device joins a conference. Subsequently, the media server provides the identifier data.

In step 205, client computing devices connect with a media server using the initial signaling data. The client computing devices may connect with the media server in any manner and at any time. Any amount of initial signaling data may be used by the client devices to connect with the media server.

In step 210, a conference is established by the media server with the client computing devices. The conference may be established using any format or method. Any number of client computing devices may connect to the conference, using any kind or type of device.

In step 215, media data for a subset of the client computing devices is sent to the client computing devices by the media server. The media data may be sent in any manner or format, and at any time. The subset of the client computing devices for which media data is sent may be determined by the media server in any manner, such as by performing dominant speaker identification. The subset may be of any size, and may vary in size during the conference. For example, if there has only been two speakers in the last ten minutes of a conference, then the subset may be smaller than if there were ten speakers in the last ten minutes of a conference.

In step 220, the media server sends identifiers of the media data to the client computing devices. The identifiers are used by client computing devices to map media data streams received from the media server to a particular client device. Examples of identifiers include, but are not limited to: a SSRC, a MSID, a client computing device identifier, or any other identifiers, as discussed above. The identifiers are sent in-band. That is, in contrast to standard use of WebRTC and a signaling server, the identifiers in step 220 are sent by the same media server that is providing media data for the conference to client computing devices, and are thus sent in-band. The same data channel that the media data uses may be used for sending the identifiers. Alternatively, a different data channel between the media server and a client device may be used. A data channel is any channel that may be used to transmit data, such as a web-socket, a User Datagram Protocol (UDP) connection, etc.

The media server does not send identifiers for every client computing device. Typically, in WebRTC conferences, a complete list of mappings and identifiers are provided to conference participants. However, since the media server is aware of which media data is currently being sent to client computing devices, there is no need to provide a complete mapping. Rather, the media server sends identifiers as needed. For example, in a conference of 100 participants, identifiers may be sent for only 5 client computing devices at a time. The identifiers that are sent may change during the conference, such as in response to new or different media data being sent to client computing devices. When the identifiers that are sent are updated, an existing identifier is not merely reassigned to a different media data stream or client computing device. Rather, instead of reassigning an identifier, the old identifier may be removed and a new identifier specific to another client computing device or media data stream added.

In step 225, mappings are updated by client computing devices using the identifiers. The mappings are updated by the client computing devices in response to receiving the identifiers from the media server. The mappings may be updated and stored or managed in any manner. Once received, the client computing devices use the identifiers to properly display the media data for the conference.

In step 230, the subset is changed by the media server and updated media data for the updated subset is sent to the client computing devices. Step 230 may be performed as discussed above in step 215.

In step 235, identifiers of the updated media data are sent to the client computing devices by the media server. Step 235 may be performed as discussed above in step 220.

In step 240, mappings are updated by client computing devices using the identifiers. Step 240 may be performed as discussed above in step 225.

Using this process, a conferencing system may utilize on demand in-band signaling to improve the quality of the conference for participants. In particular, the issues this solution resolve appear when there are twenty, thirty, or more participants in a conference. When there are over twenty, thirty, or more participants in a conference, standard WebRTC signaling is slow, and has a noticeable impact on conference quality. Additionally, some implementations of WebRTC have a hard limit on the number of participants which can be supported in a conference using WebRTC. Past the hard limit, WebRTC will stop working, such as an Application Programming Interface (API) not allowing more than a set number of participants. The hard limit is implementation specific, and may be twenty, thirty, or more participants. This disclosure presents at least one embodiment that addresses this issue in multiple ways.

In an embodiment, identifier signaling is shifted from the signaling server to the media server that provides media data to client computing devices of the conference. The media server provides the identifier signaling in-band to client computing devices. This reduces the volume of traffic involving the signaling server, and allows for the second improvement.

Further, in an embodiment, the media server does not provide identifier data for each client computing device involved in the conference, in contrast to standard signaling server behavior. Rather, the media server provides identifier data for a subset of client computing devices involved in the conference. The subset may be all client computing devices for which media data is sent to the participants of the conference. The subset may change during the conference, based on determinations made by the media server, or for any other reason or basis. This is an improvement for large conferences, as large conferences involve many participants and managing all of their identifiers and mapping can be challenging. Further, large conferences may involve much participant turnover which creates a need for constant updates. By supplying identifier data for a subset of the connected client computing devices, such as the five most recent speakers, these issues are greatly reduced, and conference quality improved.

Taken together, these solutions reduce bandwidth usage, reduce power usage, and reduce the computing time required by a conferencing system. Further, the conference technical experience for participants is improved in terms of less visible or audible jitter or distortion.

4. Example on Demand in-Band Signaling

Figure 3:
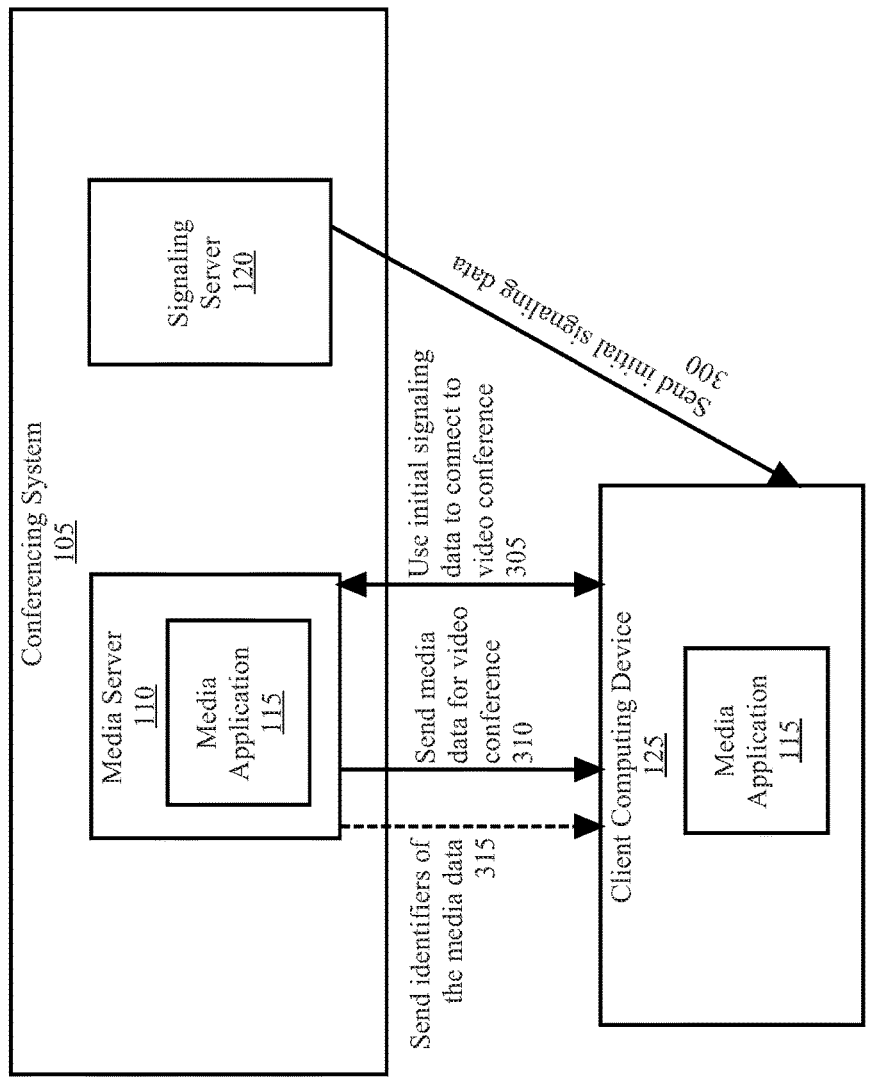
FIG. 3 illustrates an example of on demand in-band signaling in conferences.

FIG. 3 illustrates an example of on demand in-band signaling in conferences in accordance with an embodiment.

In FIG. 3, a conferencing system 105 is shown, which includes signaling server 120, media server 110, and media application 115. Client computing device 125, which is executing media application 115, is connected with the conferencing system 105 and is participant in a conference hosted by the conferencing system.

To connect with the conferencing system, client computing device 125 contacts signaling server 120 and requests initial signaling data. In response, signaling server 120 sends the initial signaling data 300 to the client computing device 125. The initial signaling data 300 identifies the codecs in use in the video conference and session establishment data needed for client computing device 125 to join the conference. The initial signaling data does not include identifier information that a client computing device may use to identify media data or client computing devices.

Next, the client computing device 125 uses the initial signaling data to connect to the video conference. Once connected, the client computing device 125 is receiving media data for the video conference 310 from the media server 110. Likewise, client computing device 125 also receives identifiers of the media data 315 from the media server. Client computing device 125 uses the identifiers to identify other client computing devices in the conference, associate audio data with matching video data, properly link media data with a particular source client computing device, maintain mappings, and other actions needed to properly display the video and audio data for the conference. The identifiers are received from the media server in-band. Further, the identifiers do not identify every client computing device or media data item of the conference. Rather, only a subset of the client computing devices or media data items of the conference are identified. The subset for which identifiers are provided may change at any time during the conference, for any reason.

With an embodiment of this disclosure, substantial savings in bandwidth, memory or storage, and computing time may be achieved in part by resolving WebRTC signaling issues. For example, by utilizing in-band communication, with which the same media server that provides media data for the conference also provides identifier signaling data, and by identifying a subset of the total client computing devices of the conference, which may change over time, embodiments can achieve a reduction in consumption of network bandwidth, storage and processor cycles.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
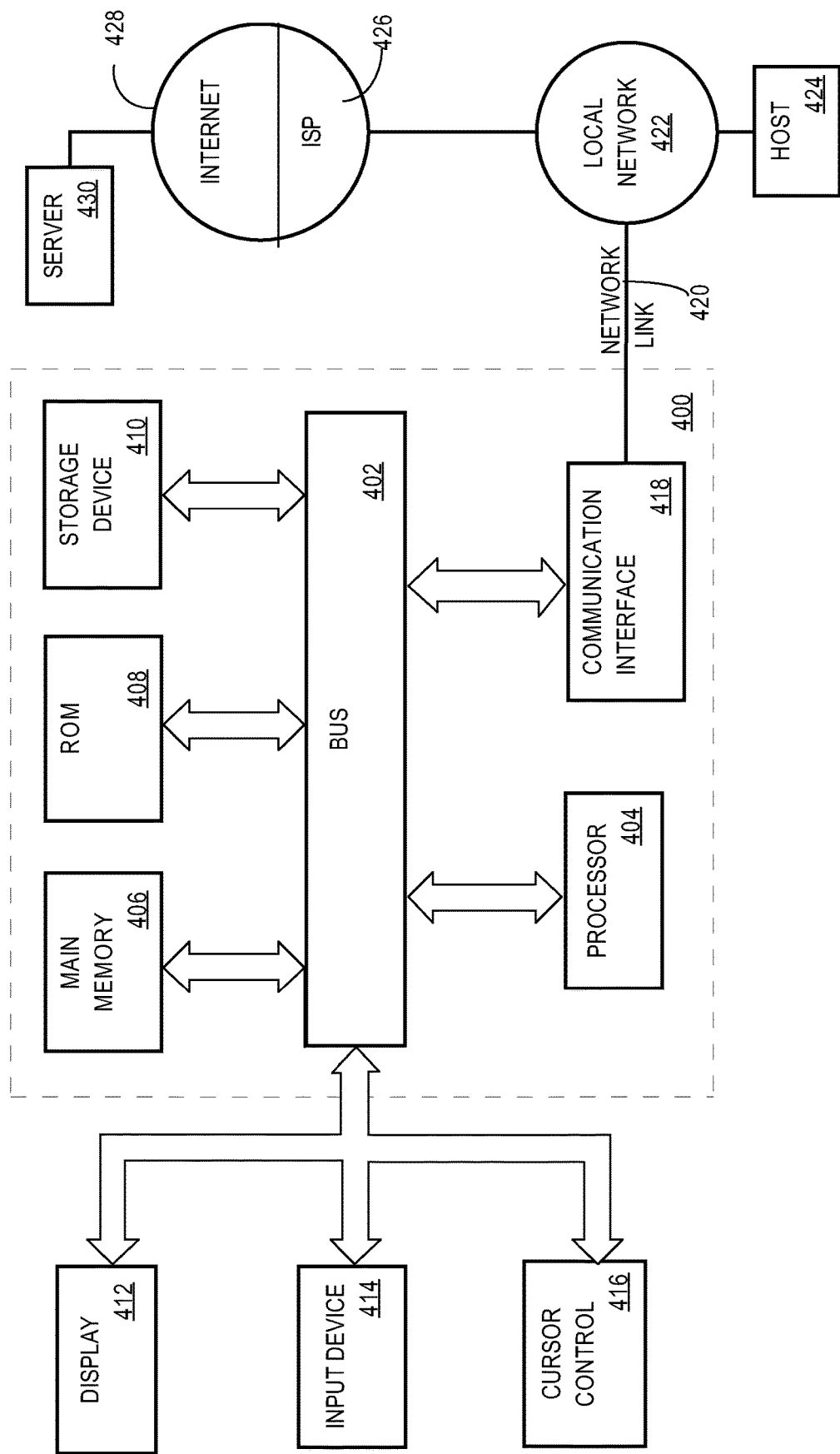
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving, at a client computing device, initial signaling data for a video conference from a signaling server, wherein the initial signaling data comprises data needed for the client computing device to connect to the video conference;
using the initial signaling data, the client computing device establishing the video conference with a media server;
receiving, at the client computing device, signaling data for the video conference from the media server, the signaling data comprising identifiers of media data that correspond to a selective subset of client computing devices of a plurality of client computing devices;
receiving, by the client computing device, media data for the video conference from the media server, wherein the client computing device is included in the selective subset of client computing devices of the plurality of client computing devices.

2. The method of claim 1, further comprising: in response to receiving the identifiers of the media data, updating a mapping by the client computing device based on the identifiers of the media data.

3. The method of claim 1, wherein the initial signaling data comprising one or more of a media type in use, a certificate fingerprint, or a credential.

4. The method of claim 1, wherein the initial signaling data omits identifiers for media data.

5. The method of claim 1, wherein the identifiers comprise one or more of a Synchronization Source Identifier (SSRC), a Media Stream Identifier (MSID), or a client computing device identifier.

6. The method of claim 1, wherein the media server uses an in-band data channel to send the identifiers of the media data.

7. The method of claim 1, wherein the media server uses Interactive Connectivity Establishment (ICE).

8. The method of claim 1, wherein the video conference uses Web Real Time Communication (WebRTC).

9. The method of claim 1, wherein the identifiers of the media data is received with the initial signaling data from the signaling server.

10. The method of claim 1, wherein the signaling server and the media server are separate servers.

11. A non-transitory computer-readable storage medium storing instructions which, when executed by one or more processors, cause the one or more processors to perform:
receiving, at a client computing device, initial signaling data for a video conference from a signaling server, wherein the initial signaling data comprises data needed for the client computing device to connect to the video conference;
using the initial signaling data, the client computing device establishing the video conference with a media server;
receiving, at the client computing device, signaling data for the video conference from the media server, the signaling data comprising identifiers of media data that correspond to a selective subset of client computing devices of a plurality of client computing devices;
receiving, by the client computing device, media data for the video conference from the media server, wherein the client computing device is included in the selective subset of client computing devices of the plurality of client computing devices.

12. The non-transitory computer-readable storage medium of claim 11, further comprising: in response to receiving the identifiers of the media data, updating a mapping by the client computing device based on the identifiers of the media data.

13. The non-transitory computer-readable storage medium of claim 11, wherein the initial signaling data comprising one or more of a media type in use, a certificate fingerprint, or a credential.

14. The non-transitory computer-readable storage medium of claim 11, wherein the initial signaling data omits identifiers for media data.

15. The non-transitory computer-readable storage medium of claim 11, wherein the identifiers comprise one or more of a Synchronization Source Identifier (SSRC), a Media Stream Identifier (MSID), or a client computing device identifier.

16. The non-transitory computer-readable storage medium of claim 11, wherein the media server uses an in-band data channel to send the identifiers of the media data.

17. The non-transitory computer-readable storage medium of claim 11, wherein the media server uses Interactive Connectivity Establishment (ICE).

18. The non-transitory computer-readable storage medium of claim 11, wherein the video conference uses Web Real Time Communication (WebRTC).

19. The non-transitory computer-readable storage medium of claim 11, wherein the identifiers of the media data is received with the initial signaling data from the signaling server.

20. The non-transitory computer-readable storage medium of claim 11, wherein the signaling server and the media server are separate servers.

* * * * *